(12) United States Patent
Purdy et al.

(10) Patent No.: US 12,312,533 B2
(45) Date of Patent: May 27, 2025

(54) COMPOSITION USEFUL IN SULFATE SCALE REMOVAL

(71) Applicant: Dorf Ketal Chemicals FZE, Fujairah (AE)

(72) Inventors: Clay Purdy, Medicine Hat (CA); Markus Weissenberger, Calgary (CA); Stig Magnor Nordaa, Sandnes (NO)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

(21) Appl. No.: 18/481,928

(22) Filed: Oct. 5, 2023

(65) Prior Publication Data

US 2024/0043737 A1 Feb. 8, 2024

Related U.S. Application Data

(63) Continuation of application No. 16/922,394, filed on Jul. 7, 2020, now abandoned.

(51) Int. Cl.
*C09K 8/528* (2006.01)
(52) U.S. Cl.
CPC .................... *C09K 8/528* (2013.01)
(58) Field of Classification Search
None
See application file for complete search history.

(56) References Cited

U.S. PATENT DOCUMENTS

| | | | |
|---|---|---|---|
| 3,625,761 A | 12/1971 | Tate et al. | |
| 4,030,548 A | 6/1977 | Richardson et al. | |
| 4,980,077 A | 12/1990 | Morris et al. | |
| 5,084,105 A | 1/1992 | Morris et al. | |
| 6,613,899 B1 | 9/2003 | Kuzee et al. | |
| 7,470,330 B2 | 12/2008 | Keatch | |
| 2006/0065396 A1* | 3/2006 | Dawson | C09K 8/52 166/305.1 |
| 2012/0318515 A1* | 12/2012 | Cawiezel | C09K 8/28 166/310 |
| 2013/0213657 A1 | 8/2013 | Dobson et al. | |
| 2013/0269937 A1 | 10/2013 | Reyes | |
| 2019/0309218 A1 | 10/2019 | Belakshe et al. | |
| 2020/0124534 A1* | 4/2020 | Murugesan | C09K 8/03 |

FOREIGN PATENT DOCUMENTS

| | | |
|---|---|---|
| WO | 1993/024199 A1 | 12/1993 |
| WO | 1995/105984 A1 | 6/1995 |
| WO | 2018/026374 A1 | 2/2018 |

* cited by examiner

*Primary Examiner* — John J Figueroa
(74) *Attorney, Agent, or Firm* — Berg Hill Greenleaf Ruscitti LLP (57) ABSTRACT

The present invention discloses a novel aqueous composition for use in removing mixed sulfate scale from a surface contaminated with such, said composition comprising: a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; a dissolution enhancer; optionally a compound such as sodium gluconate or the like and a carboxyl-containing fructan such as carboxymethyl inulin. There is also disclosed methods to use such compositions.

6 Claims, 1 Drawing Sheet

COMPOSITION USEFUL IN SULFATE SCALE REMOVAL

CROSS REFERENCE TO RELATED APPLICATIONS

This application is a continuation of U.S. application Ser. No. 16/922,394 filed on Jul. 7, 2020, which claims the benefit of and priority to Canadian Application No. 3,049,343, filed Jul. 11, 2019. The entire specification and figures of the above-referenced applications are hereby incorporated, in their entireties by reference.

FIELD OF THE INVENTION

The present invention is directed to a composition and method for use in oilfield and industrial operations, more specifically to compositions used in the removal of mixed sulfate scale.

BACKGROUND OF THE INVENTION

Scaling, or the formation of sulfate mineral deposits can occur on surfaces of metal, rock or other materials. Scale is caused by a precipitation process as a result of thermodynamic and hydrodynamic factors or changes in pressure, velocity rates and temperature and the subsequent change in the composition of a solution (commonly water).

Typical homogenous scales consist of e.g. calcium carbonate, calcium sulfate, barium sulfate, strontium sulfate, iron sulfide, iron oxides or iron carbonate. Sulfate scales and in particular the common Barium sulfate scale is a major challenge for industry and in particular the oilfield industry.

In some cases, scale deposits restrict or even shut-off the production conduit if the produced water composition flow dynamics are interrupted by changes in pressure and/or temperature. In many cases this is due to wellbore components, such as downhole chokes, safety valves or flow-controls. In addition to produced formation brine water scaling issues due to the mineral content, also other sourced water utilized in well workover or completions operations can be potential sources of scaling minerals, including water flood operations or geothermal operations.

The precipitation of sulfate scales can occur at any point in a production, injection or abandonment-disposal well and associate equipment cycle, and can also be caused by incompatibilities of injected water and formation water, in addition to the changes in temperature and pressure dynamics mentioned above, as well as wellbore additives or upsets in the flow equilibrium. Scale on surface equipment (e.g. heat exchangers, piping, valves, flow-control devices) are also a catalyst for sulfate scales. In oil & gas operations, seawater or brine is often injected into reservoirs for pressure maintenance, and as these have a high content of sulfate ions and formation water or drilling fluids often have a high content of barium, calcium, and/or strontium ions donated from the formation, these waters often cause sulfate mineral precipitation. Sulfate scaling on surface equipment, such as heat exchangers and the associated piping, is a major issue for industry as well, as it typically needs to be managed by mechanical means such as disassembling the equipment in question, manually cleaning the scale and reassembling which is very time consuming and expensive. Having a chemical solution that can treat these sulfate scales with minimal agitation and at lower temperatures would be very advantageous for industry. As the multiple sulfate composition scaling challenges occur offshore-onshore are typically very difficult to manage efficiently as a whole. Having a sulfate dissolver that solubilizes all typical sulfate scales encountered either individually or as a composition is advantageous for industry versus having to deploy specific chemistry for each type or scale or manage the scaling issues with mechanical means.

The most obvious way of preventing a scale from forming during production is to prevent the creation of super saturation of the brine being handled and manage the flow path of fluids to minimize pressure and rate differentials and to also add scale inhibitors, which themselves are minimally effective and expensive. It may also sometimes be possible by altering the operating conditions of the reservoir, for example by ensuring that the wellbore pressure is sufficient to prevent the liberation of gas and by injecting water which is compatible with formation water. However, economics usually dictate that the use of inhibitors or treating any precipitated scale is preferred to manage costs Controlling scale by the use of inhibitors as well as understanding and mitigating scaling tendencies is important for both production and injection wells, but so also is having a solution or economical means of treating any scaling that does occur, even after best practices have been implemented during the production cycle.

The design of scale treatment programs requires extensive knowledge of scaling/chemistry theory and a broad base of practical operational experience to be successful. Applications occasionally present themselves in which the ideal selection of chemicals and fluids may be beyond the scope of a wellsite engineer's experience or theoretical knowledge. Rules of thumb and general formulas may not be adequate, and selection procedures based on broader experience and more in-depth knowledge may be required. Analysis of deposits and dissolver screening ideally when considering a potential scale dissolving application, the scale that is causing the problems will have to be analyzed.

The most common sulfate scales are barium, calcium, and strontium. These alkaline earth metal salts have many similar properties and often precipitate together forming problematic sulfate scales. The deposition of this scale is a serious problem for oil and gas producers globally, causing fouling in the wellbore and surface related processing equipment These scales not only restrict the hydrocarbon flow from the formation resulting in lost production, and since the formation or injection water is saturated with sulfates, the continued deposition causes fouling and potentially failures of critical equipment such as perforations, casing, tubes, valves, and surface equipment, all with the potential to reduce the rate of oil production and result in substantial lost revenue. There is a need in industry for an effective solution to an ongoing challenge. Sulfate scales such as radium sulfate, barium sulfate, calcium sulfate etc.— are sometimes referred to as NORM scale due to their solubility characteristics—typically 0.0023 g/l in water—are more difficult to deal with than carbonate scales. Sulfate scales are not soluble in traditional acid scale dissolvers. Radium sulfate, while not being the most common sulfate scale represents a challenge in its removal as it is often imbedded in barium sulfate scale and is also radioactive and thus can carry an exposure risk and cause very expensive clean-up or disposal costs of tubing and down-hole equipment etc. when brought out of the well for replacement, general service or abandonment. Having a chemical that can be used to wash these components while still in the well and effectively clean/remove the NORM materials leaving them down-hole, allowing the operator to greatly reduce handling/disposal costs related to NORM containing wells is very advantageous.

Once this water/acid insoluble scale has formed, it is extremely difficult to remove with existing chemical options on the market.

The solubility of barium sulfate is reported to be approximately 0.0002448 g/100 ml (20° C.) and 0.000285 g/100 ml (30° C.). Existing methods to remove sulfate scale include mechanical removal and/or low performance scale dissolvers currently on the market, but both have limitations and disadvantages. Mechanical removal involves the use of milling tools, scraping, or high-pressure jetting and/or disassembly of key production equipment causing substantial down time of production and processing equipment. These methods have limited efficiency as the scale is extremely hard to remove, often forming in areas beyond the reach of the mechanical equipment as many facilities have welded joints and limited access. High pressure jetting will typically only remove the surface of the scale.

Sulfate scale dissolvers were developed to overcome the low solubility of these types of scale. Sulfate scale dissolvers work by chelating/mopping up the dissolved sulfate that is present in the water allowing more to be dissolved. To assist the rate of reaction/increase the speed and efficiency of dissolution these products are typically deployed at elevated temperatures of 50° C. to 90° C. Sulfate scale dissolution will as a result take far longer than for example carbonate scale dissolution utilizing and acid. Typical scale dissolvers such as ethylenediaminetetraacetic acid (EDTA), and variations of this molecule (such as DTPA) are used by the industry to dissolve sulfate scale with some success, and sequestering the barium, calcium, and strontium ions. However, this process requires higher temperature (usually above 75° C.), is time-consuming, and has limited dissolution capacity.

The following include some patent disclosures of sulfates scale removers. U.S. Pat. No. 4,980,077 A teaches that alkaline earth metal scales, especially barium sulfate scale deposits can be removed from oilfield pipe and other tubular goods with a scale-removing composition comprising an aqueous alkaline solution having a pH of about 8 to about 14, a polyaminopolycarboxylic acid, preferably EDTA or DTPA and a catalyst or synergist comprising oxalate anion. It is stated that when the scale-removing solution is contacted with a surface containing a scale deposit, substantially more scale is dissolved at a faster rate than previously possible.

WO 1993024199 A1 teaches the use of low frequency sonic energy in the sonic frequency range for enhancing the dissolution of alkaline earth metal scales using a scale-removing solvent comprising an aqueous alkaline solution having a pH of about 8 to about 14 and containing EDTA or DTPA and a catalyst or synergist, preferably an oxalate anion. It is stated that when the scale-removing solvent is contacted with a surface containing a scale deposit while simultaneously transmitting low frequency sonic energy through the solvent, substantially more scale is dissolved at a faster rate than previously possible.

U.S. Pat. No. 4,030,548A teaches a barium sulfate scale or solid can be dissolved economically by flowing a stream of relatively dilute aqueous solution of aminopolyacetic acid salt chelating agent into contact with and along the surfaces of the scale while correlating the composition and flow rate of the solution so that each portion of solution contains an amount of chelant effective for dissolving barium sulfate and the upstream portions of the scale are contacted by portions of the solution which are unsaturated regarding the barium-chelant complex.

U.S. Pat. No. 6,613,899 B1 teaches carboxyl-containing fructans such as carboxymethylinulin used to prevent deposition of scale composed of, for example, calcium, barium and strontium salts of sulphuric acid and carbonic acid in oil extraction. In the oil extraction method, 0.5-200 ppm of a carboxyl-containing fructan that contains 0.3-3 carboxyl groups per mono-saccharide unit is incorporated in the process water, in the process equipment or in the oil-containing formation.

U.S. Pat. No. 3,625,761A teaches a method of removing a deposit of alkaline earth metal sulfate scale in an aqueous system which comprises contacting said scale deposit with a treating composition heated to a temperature in the range of from about 86 to about 194° F. consisting essentially of an aqueous alkaline solution containing from about 4 to about 8 percent by weight of disodium hydrogen ethylenediaminetetraacetate dihydrate and having a pH in the range of about 10 to 13 for a period sufficient to dissolve at least some of the said scale, acidifying said solution to decrease the pH thereof to a pH in the range of from 7 to 8 with an acid selected from the group consisting of sulfuric acid, hydrochloric acid, oxalic acid, a mixture of sulfuric acid and oxalic acid, and a mixture of hydrochloric acid and oxalic acid, to precipitate any alkaline earth metal ion present.

U.S. Pat. No. 5,084,105A teaches that alkaline earth metal scales, especially barium sulfate scale deposits can be removed from oilfield pipe and other tubular goods with a scale-removing composition comprising an aqueous alkaline solution having a pH of about 8 to about 14, preferably about 11 to 13, of a polyaminopolycarboxylic acid, preferably EDTA or DTPA and a catalyst or synergist comprising a monocarboxylic acid, preferably a substituted acetic acid such as mercaptoacetic, hydroxyacetic acid or aminoacetic acid or an aromatic acid such as salicylic acid. The description states that when the scale-removing solution is contacted with a surface containing a scale deposit, substantially more scale is dissolved at a faster rate than is possible without the synergist.

U.S. Pat. No. 7,470,330 B2 teaches a method of removing metal scale from surfaces that includes contacting the surfaces with a first aqueous solution of a chelating agent, allowing the chelating agent to dissolve the metal scale, acidifying the solution to form a precipitant of the chelating agent and a precipitant of the metal from the metal scale, isolating the precipitant of the chelating agent and the precipitant of the metal from the first solution, selectively dissolving the precipitated chelating agent in a second aqueous solution, and removing the precipitated metal from the second solution is disclosed. This is understood to be a multi-step process which would cause longer shutdown in production and is not determined to actually be applicable in the field.

Despite the existing prior art, there are very few commercial compositions available to remove barium sulfate scale, the situation is made even more complex since most barium sulfate scale occurs in wellbores, pipes and other equipment associated with either oil production and/or oil exploration in offshore or highly regulated jurisdictions such as the North Sea. Thus, the removal of petroleum-contaminated barium sulfate scales presents an even more challenging task for oilfield operators. It is highly advantageous to industry to have a chemical option that meets these stringent environmental and HSE parameters.

There thus still exists a profound need for compositions and methods capable of removing very difficult to remove mixed sulfate scales present in oilfield equipment.

SUMMARY OF THE INVENTION

According to an aspect of the present invention, there is provided a method of removing mixed sulfate scale, said method comprising:
 providing a liquid composition comprising:
  a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
  optionally, a scale removal enhancer;
  a carboxyl-containing fructan such as carboxymethyl inulin; and
  a compound selected from the group consisting of: sodium gluconate; gluconic acid; glucono-delta-lactone; sodium gluconate; calcium gluconate; potassium gluconate;
 exposing a surface contaminated with said mixed sulfate scale to the liquid composition;
 allowing sufficient time of exposure to remove said mixed sulfate scale from the contaminated surface.

Preferably, the scale removal enhancer is selected from the group consisting of: potassium carbonate; potassium formate; cesium formate; cesium carbonate; and combinations thereof.

Preferably, the carboxyl-containing fructan is a derivative of inulin or another fructan that contains 0.3-3 carboxyl groups per anhydrofructose unit. Preferably, the derivative of inulin or another fructan that contains 0.3-3 carboxyl groups per anhydrofructose unit contains at least 0.8 carboxyl groups per anhydrofructose unit. More preferably, the carboxyl-containing fructan is carboxymethylinulin (CMI).

According to an aspect of the present invention, there is provided an aqueous composition for use in removing mixed sulfate scale from a surface contaminated with such, said composition comprising:
 a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
 optionally, a scale removal enhancer;
 carboxyl-containing fructan such as carboxymethyl inulin; and
 a compound selected from the group consisting of: sodium gluconate; gluconic acid; glucono-delta-lactone; sodium gluconate; calcium gluconate; potassium gluconate; and combinations thereof.

Preferably, the scale removal enhancer is selected from the group consisting of: potassium carbonate; potassium formate; cesium formate and cesium carbonate and combinations thereof. Preferably, the scale removal enhancer is present in the compostion in an amount ranging from 5 to 20% wt of the weight of the composition. More preferably, the scale removal enhancer is present in the compostion in an amount ranging from 10 to 15% wt of the weight of the composition. Even more preferably, the scale removal enhancer is present in the compostion in an amount of approximately 10 wt % of the weight of the composition. More preferably, the scale removal enhancer is selected from the group consisting of: $K_5DTPA$; $Cs_5DTPA$; $Na_4EDTA$; and $K_4EDTA$.

According to a preferred embodiment of the present invention, the chelating agent and counterion are present in the compostion in an amount ranging from 5 to 40 wt % of the weight of the composition. More preferably, the chelating agent and counterion are present in the compostion in an amount ranging from 10 to 30 wt % of the weight of the composition. Even more preferably, the chelating agent and counterion are present in the compostion in an amount ranging from 10 to 20 wt % of the weight of the composition.

According to a preferred embodiment of the present invention, the pH of the composition ranges from 10 to 11.

According to a preferred embodiment of the present invention, the carboxymethyl inulin is present in the compostion in an amount ranging from 0.5 to 15% wt of the weight of the composition.

According to a preferred embodiment of the present invention, the sodium gluconate is present in the compostion in an amount ranging from 1% to 20% wt of the weight of the composition.

According to an aspect of the present invention, there is provided a method of removing calcium sulfate anhydrate scale present on a contaminated surface, said method comprising:
 providing a liquid composition comprising:
  a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
  optionally, a scale removal enhancer;
  carboxymethyl inulin; and
  a compound selected from the group consisting of: sodium gluconate; gluconic acid; glucono-delta-lactone; sodium gluconate; calcium gluconate; potassium gluconate;
 exposing said surface contaminated with said mixed sulfate scale to the liquid composition;
 allowing sufficient time of exposure to remove said calcium sulfate anhydrate scale from the contaminated surface.

Preferably, the composition comprises: a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; optionally, a scale removal enhancer; carboxymethyl inulin; and sodium gluconate. Preferably, the scale removal enhancer is selected from the group consisting of: potassium carbonate; potassium formate; cesium formate and cesium carbonate and combinations thereof.

According to an aspect of the present invention, there is provided a method of solubilizing barium sulfate into particles of less than 1 micron in size, said method comprising:
 providing a surface contaminated with a scale containing barium sulfate;
 providing a liquid composition comprising:
  a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
  optionally, a scale removal enhancer;
  a carboxyl-containing fructan such as carboxymethyl inulin; and
 exposing said surface contaminated with said barium sulfate scale to the liquid composition;
 allowing sufficient time of exposure to remove particles of barium sulfate scale from the contaminated surface;
 wherein said particles of barium sulfate complexted with the carboxymethyl inulin and have a particle size of less than 1 micron;
 allowing the pH of the solution to drop from a pH ranging from 10 to 11 to a pH ranging from 7 to 8 thereby causing a reprecipitation of the solubilzed barium sulfate to a particle size of less than 1 micron.

Preferably, the scale removal enhancer is selected from the group consisting of: potassium carbonate; potassium formate; $Cs_2COOH$; $Cs_2CO_3$; and combinations thereof. Preferably, the carboxyl-containing fructan is a derivative of inulin or another fructan that contains 0.3-3 carboxyl groups per anhydrofructose unit. According to a preferred embodiment of the present invention, the derivative of inulin or another fructan that contains 0.3-3 carboxyl groups per anhydrofructose unit contains at least 0.8 carboxyl groups per anhydrofructose unit. Most preferably, the carboxyl-containing fructan is carboxymethylinulin (CMI).

According to a first aspect of the present invention, there is provided an aqueous composition for use in removing mixed sulfate scale from a surface contaminated with such, said composition comprising:
- a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
- a scale removal enhancer;
- sodium gluconate or the like; and
- carboxymethyl inulin.

According to another aspect of the present invention, there is provided a method of removing mixed sulfate scale, said method comprising the steps of:
- providing a liquid composition comprising:
- a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
- a scale removal enhancer;
- sodium gluconate or the like; and
- carboxymethyl inulin;
- exposing a surface contaminated with mixed sulfate scale to the liquid composition;
- allowing sufficient time of exposure to remove the mixed sulfate scale from the contaminated surface.

According to another aspect of the present invention, there is provided an aqueous composition for use in removing mixed sulfate scale from a surface contaminated with such, said composition comprising:
- a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
- a scale removal enhancer;
- sodium gluconate or the like; and
- carboxymethyl inulin.

Preferably, the scale removal enhancer is selected from the group consisting of: potassium carbonate; potassium formate; cesium formate and cesium carbonate and combinations thereof. Preferably, the scale removal enhancer is present in the compostion in an amount ranging from 5 to 20% wt of the weight of the composition. More preferably, from 10 to 15% wt of the weight of the composition. Also preferably, the scale removal enhancer is present in the compostion in an amount of approximately 10% wt of the weight of the composition.

Preferably, the chelating agent and counterion are present in the compostion in an amount ranging from 5 to 40% wt of the weight of the composition. More preferably, from 10 to 30% wt of the weight of the composition. Also preferably, the chelating agent and counterion are present in the compostion in an amount ranging from 10 to 20% wt of the weight of the composition.

Preferably, the pH of the composition ranges from 10 to 11.5. More preferably, the composition has a pH ranging from 10 to 11.

BRIEF DESCRIPTION OF THE FIGURE

The invention may be more completely understood in consideration of the following description of various embodiments of the invention in connection with the accompanying figures, in which.

DETAILED DESCRIPTION OF PREFERRED EMBODIMENTS

By the addition of potassium carbonate to $K_5DTPA$, the same solubility numbers can be attained at a lower pH. Instead of 13.5 a pH of 11 was sufficient to get comparable solubility numbers. This represents a considerable difference to typical commercially available products. This allows an operator to conduct scale removal operations at a lower pH and therefore increases the safety for the personel handling the remover or anyone in the surrounding area as well as environmental risks and clean up costs in the case of an uncontrolled release.

According to a preferred embodiment of the present invention, the mixed sulfate scale removing composition provides greatly improved rates of scale dissolution. This, in turn, reduces the down time for wells where the scale is being removed and associated the costs. It also reduces the cost of such treatment, by limiting the treatment time by allowing production to recommence.

As shown below, the compositions tested for removing non-contaminated barium sulfate scale permits the removal thereof at a much lower pH than what has been practiced to date. Indeed, such a composition can effectively remove barium scale under conditions where the pH is 11, rather than other scale removal compositions which require conditions where the pH is 13 or higher. Accordingly, a preferred composition according to the present invention may remove, at pH=10 up to 30 kg/m$^3$ of non-contaminated $BaSO_4$ scale. When using the term "non-contaminated $BaSO_4$ scale", it should be understood to the person skilled in the art, that what is meant is that the barium sulfate scale is not contaminated by petroleum product or a petroleum-based product.

According to a preferred embodiment of the present invention, a composition for removing mixed sulfate scale permits the removal thereof with a higher dissolution capacity. This, in turn, allows reducing the volume of scale remover necessary. This also decreases transport costs and many other related items resulting from the usage of lower volumes of scale remover.

According to a preferred embodiment of the present invention, the additional sulfate scale dissolver comprising sodium gluconate or the like. Compounds having a gluconate component or portion are understood to fall in the later category but do not comprise the entire category as other sugars are also considered to be within this description. Preferably, the compounds having a gluconate component or portion include but are not limited to: gluconic acid (CAS #526-95-4); glucono-delta-lactone (CAS #90-80-2); sodium gluconate (CAS #527-07-1); calcium gluconate (CAS #299-28-5/18016-24-5); potassium gluconate (CAS #299-27-4). Potassium gluconate being preferred.

According to a preferred embodimemt of the present invention, the carboxyl-containing fructans are understood to be a derivative of inulin or another fructan that contains 0.3-3 carboxyl groups per anhydrofructose unit. In particular, the derivative contains at least 0.8 carboxyl groups per anhydrofructose unit. Preferably, the carboxyl groups can be present in the form of carboxyalkyl groups, such as carboxymethyl, carboxyethyl, dicarboxyrnethyl or carboxyethoxycarbonyl groups. According to a preferred embodiment of the present invention, mixed carboxyfructans can also be used. Preferably, the number of carboxymethyl groups is greater than the number of other carboxyl groups. The most preferred of the carboxyl-containing fructans is carboxymethylinulin (CMI). Carboxymethylinulin (CMI) having a degree of substitution of 0.15-2.5 is disclosed in WO 95/15984. Mixed carboxyl derivatives the inulin can have been first carboxymethylated and then oxidised or vice versa. According to a preferred embodimemt of the present invention, the carboxyl-containing fructan has an average chain length (=degree of polymerisation, DP) ranging between 3 and 1000, but preferably, the average chain length ranges from 6-60 monosaccharide units.

Absolute Solubility of Barium Sulfate Scale

The inventors have previously noted that chelating agents such as EDTA (Ethylenediaminetetraacetic acid) or DTPA (diethylenetriaminepentaacetic acid) and the ability to dissolve non-contaminated barium sulfate depends substantially on the size and ion strength of the counterion.

In Tables 1 and 2 (absolute solubility testing) the absolute (or maximum) solubility of non-contaminated increases with the size of the counterion from lithium to cesium. TEAH (Tetraethylammonium hydroxide) and TBAH (Tetrabuthylammonium hydroxide) as organic bases (counterions) are showing the same trend. Information indicates that the size of the TBAH cation (including the hydrate layer) is comparable to potassium.

The solubility numbers for both were found to be very similar. In order to quantitatively compare the kg/solubility properly, the $BaSO_4$: chelating agent ratio was calculated in g/mol and the $Ba^{2+}$:chelating agent ratio was calculated in mol/mol. The mol:mol ratio indicates the number of molecules of the chelating agent needed to dissolve one ion of $Ba^{2+}$ (complex). The highest ratio which was found was almost 0.5, which means that there needs to be, on average, 2 molecules of DTPA to dissolve 1 $Ba^{2+}$ ion but mostly it can be much less.

Tests performed have indicated that, besides the nature of the counterion, an excess of the counterion also improves the solubility. $K_5DTPA$ was tested in conjunction with KCl, $K_2CO_3$ and KOOCH (potassium formate). It seems that the counterion play also a large role as $K_2CO_3$ (with the larger anion) was much more effective than KCl (with a small anion).

TABLE 1

Absolute solubility of non-contaminated barium sulfate scale (when using a 40% solution of the scale removing composition)

| | pH | 40 wt % sol BaSO4 (kg/m3) | BaSO4 (g/mol) | Ba2+ (mol/mol) |
|---|---|---|---|---|
| Li5DTPA | | 2 | | |
| Na5DTPA | 13.01 | 17 | 20.24 | 0.088 |
| K5DTPA | 13.25 | 46 | 62.16 | 0.266 |
| K5DTPA + 10 wt % K2CO3 | 13.21 | 38 | 51.35 | 0.22 |
| Cs5DTPA | 13.4 | 52 | 72.2 | 0.309 |
| Na4EDTA | 13.11 | 9 | 7.89 | 0.034 |
| K4EDTA | 13.32 | 31 | 32.98 | 0.141 |

TABLE 1-continued

Absolute solubility of non-contaminated barium sulfate scale (when using a 40% solution of the scale removing composition)

| | pH | 40 wt % sol BaSO4 (kg/m3) | BaSO4 (g/mol) | Ba2+ (mol/mol) |
|---|---|---|---|---|
| TEAH4DTPA | 13.1 | 14 | 43.75 | 0.187 |
| TBAH5DTPA | 13.33 | 18 | 64.28 | 0.275 |

TABLE 2

Absolute solubility of non-contaminated barium sulfate scale (when using a 20% solution of the scale removing composition) at 60° C.

| | pH | 20 wt % sol BaSO4 (kg/m3) | BaSO4 (g/mol) | Ba2+ (mol/mol) |
|---|---|---|---|---|
| K5DTPA | 13.19 | 27 | 72.97 | 0.313 |
| K5DTPA + 5 wt % K2CO3 | 13.32 | 41 | 110.81 | 0.475 |
| K5DTPA + 5 wt % K2CO3 | 11.25 | 40 | 108.11 | 0.463 |
| K5DTPA + 5 wt % K2CO3 | 10 | 33 | 89.19 | 0.3821 |
| Cs5DTPA + 5 wt % CsCO3 | | 35 | | |
| Cs5DTPA + 10 wt % CsCO3 | | 35 | | |
| Cs5DTPA + 10 wt % HCOOCs | | 30 | | |
| TEAH4DTPA + 10 wt % K2CO3 | | 21 | | |
| TBAH5DTPA + 10 wt % K2CO3 | | 25 | | |

Moreover, the $K_5DTPA$ composition (at 40%) was determined to dissolve 30 $kg/m^3$ of FeS for a g/mol total of 40.54.

Preferably, the dissolution of non-contaminated barium sulfate in an amount above 20 $kg/m^3$. More preferably, dissolution of barium sulfate above 30 $kg/m^3$ is desired.

Speed of Barium Scale Dissolution

A second set of tests were performed to study the speed of dissolution of non-contaminated barium sulfate scale. In order to determine the speed, a relatively small amount of $BaSO_4$ (0.25 g—this equates to 10 $kg/m^3$) was used and the time was measured until the solution became clear. Large differences were noted. The best results involved the combination of $K_5DTPA$ with $K_2CO_3$. This combination provided a dissolution time which was almost 4 times faster than $K_5DTPA$ alone.

The speed of dissolution of compositions according to preferred embodiment of the present invention were tested and studied. Table 3 summarizes the findings of the testing. The experiment involved the dissolution of 0.25 g of $BaSO_4$ in a volume of 50 ml fluid at 60° C. under gentle stirring by magnetic stir bar.

TABLE 3

Speed of dissolution of non-contaminated barium sulfate scale

| Fluid | Time | pH |
|---|---|---|
| K5DTPA (40%) | 1 h 44 min | 13.26 |
| K5DTPA (40%) + 10% TBAH | 1 h 38 min | 13.4 |

TABLE 3-continued

Speed of dissolution of non-contaminated barium sulfate scale

| Fluid | Time | pH |
|---|---|---|
| $K_5$DTPA (40%) + 20% TBAH | 1 h 21 min | 13.43 |
| $K_5$DTPA (40%) + 30% TBAH | 1 h 20 min | 13.49 |
| $K_5$DTPA (40%) + 10 wt % KCl | 1 h 24 min | 13.27 |
| $K_5$DTPA (40%) + 10% $K_2CO_3$ | 30 min | 13.22 |
| $K_5$DTPA (20%) + 5% $K_2CO_3$ | 22-23 min | 10.5-11 |

This testing indicates that both the extent of barium scale dissolution and the speed at which it is dissolved represent marked improvements over known compositions.

Preferably, the scale removal enhancer is selected from the group consisting of: $K_2CO_3$; KOOCH; $CsCO_3$; CsCOOH and combinations thereof. Preferably, the scale removal enhancer is $K_2CO_3$. Preferably also, the scale removal enhancer is present in an amount ranging from 5 to 30% by weight of the scale removal composition. More preferably from 10 to 20% by weight and even more preferably, the scale removal enhancer would be present in an amount of approximately 10% by weight.

Impact of Temperature

The speed of dissolution of a barium scale dissolver composition was tested and studied under different temperature conditions on non-contaminated barium sulfate scale. Table 4 summarizes the findings of the testing. The experiment involved the dissolution of 0.25 g of $BaSO_4$ in a volume of 50 ml fluid at various temperatures under gentle stirring by magnetic stir bar. The composition tested comprised a 20 wt % solution of $K_5$DTPA and 5 wt % $K_2CO_3$.

TABLE 4

Impact of Temperature on the Dissolution of Barium Sulfate

| Temperature in ° C. (° F.) | Time (minutes) |
|---|---|
| 25 (77) | 225 |
| 40 (104) | 50 |
| 60 (140) | 22 |
| 80 (176) | 3.5 |
| 90 (194) | 1.5 |

Laboratory Testing of Scale Dissolution

The sample selected for the solubility testing origins from an oilfield tubular containing sulfate scale crystals originally used for demonstration purposes. Crystals of non-contaminated barium sulfate scale were removed from the tubular to be used for the solubility testing. 200 cc of composition ($K_5$DTPA 20 wt % and 5 wt % $K_2CO_3$) was used. A weighted portion of oilfield sulfate scale sample was submerged in 200 cc of each de-scaling composition. A small magnetic stirrer is added to create a very minimal vortex, creating a small movement of fluid without rigorously stirring the fluid. The fluid was heated to 70° Celsius.

Results 25.165 grams of non-contaminated oilfield sulfate scale was weighted and added to the fluid. The stirrer and heater were started. After 1 hour a slight colouring of the fluid was observed. After 4 hours at temperature when no continued visual reduction of scale was observed, the fluid has been filtered and the filter rinsed with water, dried and weighted back. The maximum scale solubility was reached and subsequently calculated.

The base barium scale dissolver composition (used in later testing and referred to as "base BSD") comprises a 20 wt % solution of $K_5$DTPA and 5 wt % $K_2CO_3$. The base BSD was able to dissolve 52.97 grams per litre of scale at 70° C. The testing was also carried out with a commercially available product (Barsol NS™), which is alkali/EDTA based and with EDTA. The Barsol NS™ product was capable of dissolving 24.19 grams per litre. While EDTA alone only dissolved around 6 grams per litre. Under identical conditions, the base BSD was shown to have more than double the performance of Barsol NS™.

According to a prefered embodiment of the present invention, there is provided a one-step process for removing mixed sulfate scale inside a wellbore, said process comprising:

providing a liquid composition comprising:
  a chelating agent selected from the group consisting of: $Li_5$DTPA; $Na_5$DTPA; $K_5$DTPA; $K_5$DTPA; $Cs_5$DTPA; $Na_4$EDTA; $K_4$EDTA; $TEAH_4$DTPA; and $TBAH_5$DTPA;
  a carboxyl-containing fructan or a salt thereof such as carboxymethyl inulin; and
  a compound selected from the group consisting of: sodium gluconate; gluconic acid; glucono-delta-lactone; sodium gluconate; calcium gluconate; potassium gluconate;
exposing a surface contaminated with mixed sulfate scale to the liquid composition;
allowing sufficient time of exposure to remove some or all of the mixed sulfate scale from the contaminated surface. The person skilled in the art will understand that what is meant by "one-step" is that there is a single treatment step in the process (or method) to remove mixed sulfate scale.

When the surface contaminated with mixed sulfate scale is deep undergound or a hard to access tubing or piping, the exposure consists of circulating the liquid composition through the tubing or piping until it has been established that the scale has been removed beyond a desirable predetermined point. Hence, in some cases, it is quite possible that the entirety of the scale present is not removed but the amount of removal is sufficient to re-start operations and provide the desired productivity and/or circulation through the affected tubing/piping. The liquid composition can also be heated in order to improve the removal of the scale and the speed at which the removal is effected.

According to another preferred embodiment of the present invention, the method of treatment of mixed sulfate scale wherein the fluid is «spotted», i.e. placed in a tube/tank/pipe/equipment in a soaking operation. This may in some instances be somewhat less efficient than circulating or agitating the fluid due to the surface reaction nature of the fluid, but it is used in some cases to remove enough scale to run tools, pull stuck tubing or free blocked flow control equipment etc., for example.

Sulfate scales that are commonly found inside wellbores include calcium sulfate, strontium sulfate and barium sulfate. Up to now, it was believed that an effective barium sulfate scale dissolver was the missing link in order to remove very difficult to remove scales. It was surprisingly discovered that depending on the type of calcium sulfate present in the mixed sulfate scales the scales may be more or less easy to remove. The most common form of calcium sulfate is the dihydrate. Upon exposure to pressure and temperature, the dihydrate converts to hemihydrate and ultimately to the anhydrous form. Calcium sulfate anhydrous presents a substantially more difficult to remove scale than its dihydrate counterpart.

Tests were carried out in order to assess the advantage of a composition according to a preferred embodiment versus a typical mix of sulfate scales that is encountered during oil industry operations. As calcium sulfate is by far the most common scale component, it is believed that these tests are quite representative of actual mixture. The solubility of the scale mixture was evaluated against the base BSD composition and two preferred embodiments of the present invention. The results are listed in Table 5 below.

TABLE 5

Solubility of mixed sulfate scales comprising Calcium sulfate, Strontium sulfate and barium sulfate at 60° C.

| Solution | Sodium Gluconate (wt %) | 25-30 UP (vol %) | Scale | wt of scale (g) | wt of filter (g) | wt of fil and prod (g) | Total Solubility kg/m3 |
|---|---|---|---|---|---|---|---|
| 100% base BSD | 5 | 1 | 80% CaSO4•2H2O 1% SrSO4 19% BaSO4 | 10.0003 | 0.2764 | 3.1851 | 70.916 |
| 100% base BSD | 10 | 1 | 80% CaSO4•2H2O 1% SrSO4 19% BaSO4 | 10.0006 | 0.2872 | 3.1888 | 70.990 |
| 100% base BSD | \ | \ | 80% CaSO4•2H2O 1% SrSO4 19% BaSO4 | 10.0017 | 0.2904 | 3.6249 | 66.672 |
| 80% base BSD, 20% H2O | 10 | 1 | 80% CaSO4•2H2O 1% SrSO4 19% BaSO4 | 10.0048 | 0.2829 | 3.9884 | 62.993 |

NB: 100% base BSD refers to an undiluted solution of the composition as set out previously. A diluted solution of base BSD is referred to in the amount of residual stock concentration after dilution. 25-30 UP refers to a commercial sodium carboxymethyl inulin composition having a 30-32 wt % NaCMI content.

Tests were carried out in order to assess the advantage of a composition according to a preferred embodiment versus a calcium scale in both the dihydrate form and in the anhydrous (anhydrate) form. As calcium sulfate is the most common scale component in a mixture of sulfate scales, it was believed to be important to assess the effectiveness of the known descaler against two preferred embodiments of the present invention. It is known that while calcium sulfate dihydrate and calcium sulfate anyhdrate have greatly different properties and that the dihydrate form is both the most common and first to be formed when depositing. What is also known is that the dihydrate will convert to more stable forms upon exposure to heat and pressure. The most stable form of calcium sulfate being the anyhydrate. The results of the experiments are listed in Table 6 below.

The results of Table 6 indicate that the type of calcium scale (anydrate vs dihydrate) has a substantial and marked impact of the dissolution efficiency of the scale dissolvers tested.

The use of sodium gluconate is an effective component in the removal of smaller cations present in a mixed sulfate scale. Varying the amount of sodium gluconate (or the like) can have a direct impact on the effectiveness of the composition according to a preferred embodiment of the present invention as it provides for an increased dissolution power of mixed sulfates scale. Sodium gluconate is a representative compound of sugars which have the same properties including but not limited to the gluconate or the like categorization and it is quite effective in the presence of scale containing transition metal cations (such as, but not limited to, iron, manganese, zinc, tin) and post-transition metal cations (such as, but not limited to, aluminum, lead) as these cations have typically a smaller ion radii. According to a preferred embodiment, the gluconate or the like can be present in a concentration ranging from 0.1 wt % to 20 wt % of the total weight of the composition, more preferably from 1 to 20 wt %. According to another preferred embodiment, the gluconate or the like can be present in a concentration ranging from 1 wt % to 10 wt % of the total weight of the composition,

TABLE 6

Solubility of Calcium sulfate (anhydrous) and Calcium sulfate (dihydrate)

| Solution | Sodium Gluconate (wt %) | 25-30 UP (vol %) | Scale | wt of scale (g) | wt of filter (g) | wt of fil and prod (g) | Total Solubility kg/m3 |
|---|---|---|---|---|---|---|---|
| 100% Base BSD | 5 | 1 | 100% CaSO4•2H2O | 10.0001 | 0.2773 | 3.1126 | 71.648 |
| 100% Base BSD | 10 | 1 | 100% CaSO4•2H2O | 10.0021 | 0.2653 | 2.7927 | 74.747 |
| 100% Base BSD | \ | \ | 100% CaSO4•2H2O | 10.0009 | 0.2647 | 3.0829 | 71.827 |
| 100% Base BSD | 5 | 1 | 100% CaSO4 (Anhydrous) | 10.0027 | 0.2873 | 5.8483 | 44.417 |
| 100% Base BSD | 10 | 1 | 100% CaSO4 (Anhydrous) | 10.0007 | 0.2774 | 5.4992 | 47.789 |
| 100% Base BSD | \ | \ | 100% CaSO4 (Anhydrous) | 10.0058 | 0.2774 | 7.9699 | 23.133 |
| 100% Base BSD | \ | \ | 100% CaSO4 (Anhydrous) | 10.0017 | 0.2662 | 7.1513 | 31.166 | more preferably ranging from 1 to 5 wt %, even more preferably ranging from 1 to 3 wt %.

While the presence of sodium gluconate or the like is preferable in some cases, the presence of such a compound has its limitations. For operations carried out at temperatures of 150° C. or more, gluconates have a tendency of being less stable and degrading, and thus would be not desirable for such applications. For this reason, its use in high temperature applications has limitations. Hence, in situations where the operating temperature encountered by the compositions used are of 150° C. or higher, a preferred composition of the present invention will not necessarily require the presence of a gluconate compound (or the like). Thus, a preferred embodiment of the present invention to be used for the removal of mixed sulfate scale at high temperatures (i.e. above 150° C.) will comprise: a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; optionally, a scale removal enhancer; a carboxyl-containing fructan such as carboxymethyl inulin. Thus, a preferred embodiment of the present invention to be used for the removal of predominantly barium sulfate scale will comprise: a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; optionally, a scale removal enhancer; a carboxyl-containing fructan such as carboxymethyl inulin.

Moreover, the compositions according to preferred embodiments of the present invention used are environmentally safer than many other dissolvers. This represents a major advantage over any known chemically-based methods of mixed sulfate scale. Another advantage to the compositions according to preferred embodiments of the present invention includes the speed of dissolution which is considerably faster than any known commercial compositions. Another advantage of preferred compositions according to the present invention is that they can be employed on wells according to a one-step process and thus are very desirable to operators which deal with mixed sulfate scale issues on a regular basis, such as in the North Sea.

According to another aspect of the present invention, there is provided a method of solubilizing barium sulfate into particles of less than 1 micron in size, said method comprising:
  providing a surface contaminated with a scale containing barium sulfate;
  providing a liquid composition comprising:
    a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
    optionally, a scale removal enhancer;
    a carboxyl-containing fructan such as carboxymethyl inulin; and
    a compound selected from the group consisting of: sodium gluconate; gluconic acid; glucono-delta-lactone; sodium gluconate; calcium gluconate; potassium gluconate;
  exposing said surface contaminated with said barium sulfate scale to the liquid composition;
  allowing sufficient time of exposure to remove particles of barium sulfate scale from the contaminated surface; wherein said particles of barium sulfate are complexed with the carboxymethyl inulin and have a particle size of less than 1 micron;
  allowing the pH of the solution to drop from a pH ranging from 10 to 11 to a pH ranging from 7 to 8 thereby causing a reprecipitation of the solubilzed barium sulfate to a particle size of less than 1 micron (due to the low solubility product of barium sulfate at low pH (7 to 8).

The interaction of the CMI with the dissolved barium sulfate is not completely clear but it seems that the CMI interacts/intereferes with the crystal surface of the barium sulfate in order to prevent/minimize/inhibit crystal growth and thus maintain barium sulfate at a particle size of less than 1 micron. It is hypothesized that the CMI-barium sulfate complex creates a sort of nanoparticle which, because of its small size is capable of undergoing brownian motion and thus never quite settling (i.e. does not reprecipitate, at least during the period of duration (up to 7 days) which the testing herein seems to support). According to a preferred embodiment, the carboxyl-containing fructan can be present in a concentration ranging from 0.01 wt % to 15 wt % of the weight of the composition, more preferably from 0.5 wt % to 15 wt %. According to another preferred embodiment, the carboxyl-containing fructan can be present in a concentration ranging from 0.01 wt % to 1 wt %. According to a more preferred embodiment, the carboxyl-containing fructan can be present in a concentration ranging from 0.1 wt % to 0.5 wt %. According to yet another preferred embodiment, the carboxyl-containing fructan can be present in a concentration ranging from 0.01 wt % to 0.4 wt %, more preferably from 0.1 wt % to 0.35 wt %, even more preferebly from 0.25 wt % to 0.32 wt %

Once a composition according to a preferred embodiment of the present is exposed to a surface contaminated with sulfate scale, the scale is removed over a period of time but the dissolved scale is at risk of reprecipitating upon exposure to formation water. Since the scale dissolver has a pH preferably ranging from 11 to 11.5, the barium sulfate and other scales will dissolve but as the dissolved scale is increasingly exposed to the formation water which typically has a pH of about 6 to 7, the pH of the water around the dissolved scale will decrease. The reprecipitation of barium sulfate at around pH=8 is unavoidable as the ksp for barium sulfate is very low at such pH. This is one of the main reasons why the above mentioned preferred composition is desirable as it will prevent reprecipitation of barium sulfate and thus allow fluids to flow after scale removal.

Comparative Testing of a Preferred Scale Dissolver of the Present Invention

In order to assess the efficiency of a preferred scale dissolver of the present invention, it was compared to three other commercially barium sulfate scale dissolver at 50° C. and at 90° C. The results of the testings are found in tables 7 and 8 below. Compositions A, B, and C are commercially available barium sulfate scale dissolvers. Composition D is a preferred scale dissolver of the present invention which comprises the base BSD+10 wt % sodium gluconate and 1% vol of CMI (at approximately 30-32 wt %).

TABLE #7

Amount of barium sulfate scale dissolved after 24 hours at a temperature of 50° C.

| Composition | Barium Sulfate Scale dissolved (in wt %) |
| --- | --- |
| A | 57 |
| B | 16 |
| C | 72 |
| D | 84 |

TABLE #8

Amount of barium sulfate scale dissolved after 24 hours at a temperature of 90° C.

| Composition | Barium Sulfate Scale dissolved (in wt %) |
| --- | --- |
| A | 77 |
| B | 22 |
| C | 79 |
| D | 87 |

In both experiments, the composition according to a preferred embodiment of the present invention (Composition D) performed better than all three commercially available barium sulfate scale dissolvers. Another non-negligible observation is that all three commercially availble barium sulfate scale dissolvers (A, B and C) have a pH above 12 (some close to 13), while Composition D has a pH ranging between 11 and 11.5. This difference in pH is significant for operators and any personel handling this type of caustic product, and thus it is highly desirable to have a product with a pH as close to neutral as possible.

Comparative Testing With Other Sulfate Scale Inhibitors

In another round of testing, various commercially availble barium sulfate scale dissolvers (compositions A, B, D, E, F, I, J, K, L, N, and P) were tested for mixed sulfate scale dissolving efficiency (at 60° C.) compared to a composition according to a preferred embodiment of the present invention (Composition Q which comprises base BSD+CMI (1% vol. (at approximately 30-32 wt %))+sodium gluconate (10 wt %)).

Figure 1:
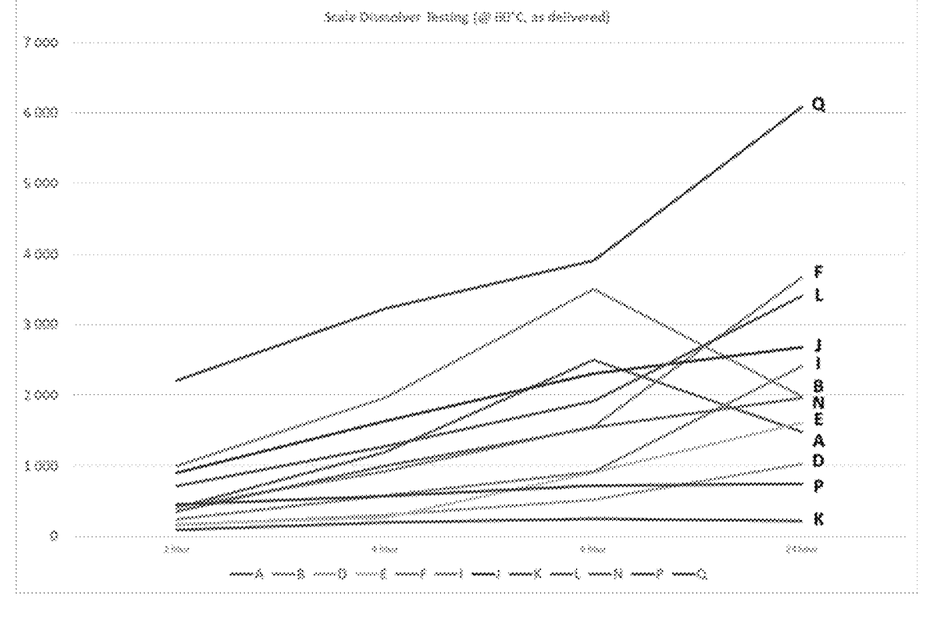
FIG. 1 is the graphical representation of the dissolution performance of a composition according to a preferred embodiment of the present invention in comparison to various other commercially available sulfate scale dissolver over a time period of 24 hours at 60° C.

Composition Q performed better than all of the commercially available mixed sulfate scale dissolvers. The composition of the scale was (major elements only): barium (44 wt %); calcium (4.4%); strontium (8.4 wt %), the balance of the composition of the scale being mainly made up by the anions and organic compounds. The scale dissolution for each composition was measured at 2 hours, 4 hours 8 hours and 24 hours after start of treatment. FIG. 1 is the graphical representation of the performance of each composition over a time period of 24 hours at 60° C. The time axis (x-axis) was not graphed to scale as the sheer number of compositions tested would not be easily distinguishable in the first three measurements (2, 4 and 8 hours) and the graphical depiction provided in FIG. 1 allows to better assess the efficiency of each composition over time. The composition according to a preferred embodiment of the present invention was by far by the most effective scale dissolver in total dissolved scale (measured in ppm). As well, contrary to Compositions A and B which started to have reprecipitation occur after 8 hours, Composition Q maintained the dissolved scale and managed to dissolve even more scale after the 8 hours measurement.

Barium Sulfate Reprecipitation Laboratory Tests

Several experiments were conducted to assess the ability of certain compositions (base BSD, base BSD+CMI (1% vol. (at approximately 30-32 wt %)), and base BSD+sodium gluconate (10 wt %)) to maintain the dissolved barium sulfate in solution.

Reprecipitation Experiment #1

Three blends containing the Base BSD composition (Base BSD, Base BSD+CMI, and Base BSD+sodium gluconate) were prepared with added barium sulfate and were observed as reprecipitation occurred at each pH interval from 11 to 7 with the addition of 1 N hydrochloric acid. 61.66% of the barium sulfate precipitate was filtered out from the Base BSD+sodium gluconate solution and 12.94% of the barium sulfate precipitate was filtered from the Base BSD+CMI solution, with the remainder staying suspended in solution.

Procedure: To observe the reprecipitation of barium sulfate, 2.0000 g of barium sulfate was dissolved in 100 mL of each Base BSD compositions (Base BSD, Base BSD+CMI, and Base BSD+sodium gluconate) at 60° C. for 4 hours on a heated stir plate at 190 rpm. The solutions were then cooled to ambient temperature, transferred into new beakers and then placed onto stir plates with stir bars. A pH probe was placed in the solution to monitor the pH of the solution as 1N hydrochloric acid (HCl) was added drop wise, with a photo taken at each pH interval.

After 3 days, the reprecipitated solutions were filtered through P8 and then P2 filter paper and then re-examined after 7 days.

Results and Observations:

Using P8 and P2 filter papers, 61.66% of the barium sulfate precipitate was filtered out from the Base BSD+sodium gluconate solution. For the base BSD+CMI solution, 12.94% of the barium sulfate precipitate was filtered out while the remaining barium sulfate stayed suspended in solution for a period of up to at least 7 days.

Barium Sulfate Reprecipitation Laboratory Tests—Experiment #2

Base BSD+CMI test solutions were heat treated in a high pressure/high temperature Teflon lined cell at 150° C. (302° F.), at 400 psi, for 6 hours and 24 hours to simulate downhole conditions. Barium sulfate was then dissolved in the heat-treated Base BSD+CMI to ensure unaltered functionality. Afterwards, the pH was lowered stepwise to 7 with the addition of 1 N hydrochloric acid. This was executed to determine the pH where reprecipitation occurs and if the specific additive in Base BSD+CMI is still functional after the heat treatment to suppress the precipitation formation to a lower pH and if the formed barium sulfate crystal size is still altered to smaller particle sizes by Base BSD+CMI. The different solutions with the reprecipitation were filtered through filters with different pore sizes. It was determined that a minimum of 94 wt % of the barium sulfate reprecipitate from both Base BSD+CMI test solutions (6 hours and 24 hours at 150° C.) is smaller than 1 μm. The remaining crystal material stays suspended in solution for an extended time (7 days) without further settling out.

Procedure: Base BSD+CMI solutions were prepared and exposed to a heat treatment in high pressure/high temperature Teflon lined cells at 150° C., at 400 psi, for 6 hours and 24 hours. After the heat treatment, each cell was depressurized and the solution was allowed to cool to ambient temperature. No visual decomposition of the additive package in the Base BSD+CMI was observed.

To determine the functionality of the heat-treated Base BSD+CMI, 2.0 g of barium sulfate was dissolved in 100 mL of the two Base BSD+CMI blends (heat-treated at 6 hours at 150° C., and 24 hours at 150° C.) at 60° C. for 4 hours on a heated stir plate at 190 rpm. The solubility capability was unaltered compared to non heat-treated Base BSD+CMI. The solutions were then cooled to ambient temperature. The solutions were transferred into a beaker with a stir bar and placed on a stir plate. A pH probe was placed in the solution to monitor the pH of the solution as IN hydrochloric acid (HCl) was added (drop wise). A photo was taken at each pH interval. The first slight reprecipitation of barium sulfate occurs at a pH of 8. Full reprecipitation occurred at a pH of 7. The test solutions were stored at room temperature for 3 days.

After 3 days, the reprecipitated barium sulfate from the Base BSD+CMI solutions were filtered through P8 and then through P2 filter paper and allowed to rest for 7 days further days.

Results:

Using the P8 and P2 filter paper, 97.4 wt % of the barium sulfate reprecipitate passed both filters from the Base BSD+CMI (24 hours at 150° C.) solution and 94.3 wt % of the barium sulfate reprecipitate passed both filters from the Base BSD+CMI (6 hours at 150° C.) solution. The remaining material stayed suspended in solution. Based on these results and observations the assumption is, that the majority of the formed crystalline material is smaller than 1 μm. This is a direct effect of the utilized additive package of the Base BSD+CMI.

Barium Sulfate Reprecipitation Laboratory Tests—Experiment #3

To observe the reprecipitation of barium Sulfate laboratory tests were carried out to compare three compositions (the base BSD, base BSD+CMI, and base BSD+sodium gluconate) were prepared with barium sulfate to be observed as reprecipitation occurs at each pH interval from 11 to 7 with the addition of 1 N hydrochloric acid.

Procedure: To observe the reprecipitation of barium sulfate, 2.0000 g of barium sulfate was dissolved in 100 mL of the three tested BSD compositions (base BSD, base BSD+CMI, and base BSD+sodium gluconate) at 60° C. for 4 hours on a heated stir plate at 190 rpm. The solutions were then cooled to ambient temperature. The solutions were transferred into a beaker with a stir bar and placed on a stir plate. A pH probe was placed in the solution to monitor the pH of the solution as 1N hydrochloric acid (HCl) was added (drop wise). A photo was taken at each pH interval.

After 3 days, the reprecipitated solutions were filtered through P8 filter paper and then through P2 filter paper and allowed to rest for 7 days for further observation. Fischer Scientific P8 filter papers have a porosity such that particles greater than 20 microns are filtered out. The P2 filter paper (from Fischer Scientific) has a porosity such that particles as small as 1 micron are filtered out of solution.

Observations: The barium sulfate precipitate was filtered out from the solution containing only the Base BSD however the precipitate in the solutions containing the Base BSD+1% vol. CMI and the Base BSD+sodium gluconate could not be filtered and remained suspended in solution even after 7 days.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of removing mixed sulfate scale, said method comprising:
   providing a liquid composition comprising:
      a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; a scale removal enhancer selected from the group consisting of: potassium formate; cesium formate; cesium carbonate; and combinations thereof;
      a carboxyl-containing fructan; and
      a compound selected from the group consisting of: sodium gluconate; gluconic acid; glucono-delta-lactone; sodium gluconate; calcium gluconate; potassium gluconate;
   exposing a surface contaminated with said mixed sulfate scale to the liquid composition; and
   allowing sufficient time of exposure to remove said mixed sulfate scale from the contaminated surface.

2. The method according to claim 1, wherein the scale removal enhancer is selected from the group consisting of: potassium carbonate; potassium formate; cesium formate; cesium carbonate; and combinations thereof.

3. The method according to claim 1, wherein the carboxyl-containing fructan is carboxymethylinulin (CMI).

4. A method of solubilizing barium sulfate into particles of less than 1 micron in size, said method comprising:
   providing a surface contaminated with a scale containing barium sulfate;
   providing a liquid composition comprising:
      a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAHsDTPA$;
      a scale removal enhancer selected from the group consisting of: potassium formate; cesium formate; cesium carbonate; and combinations thereof;
      a carboxyl-containing fructan including carboxymethyl inulin; and exposing said surface contaminated with said barium sulfate scale to the liquid composition;
   allowing sufficient time of exposure to remove particles of barium sulfate scale from the contaminated surface;
   wherein said particles of barium sulfate complexed with the carboxymethyl inulin and have a particle size of less than 1 micron; and
   allowing the pH of the solution to drop from a pH ranging from 10 to 11 to a pH ranging from 7 to 8 thereby causing a reprecipitation of the solubilized barium sulfate to a particle size of less than 1 micron.

5. The method according to claim 4, wherein the carboxyl-containing fructan is carboxymethylinulin (CMI).

6. A method of removing barium scale comprising:
   providing a barium scale dissolver composition comprising: a solution of $K_5DTPA$ at approximately 20 wt % and $K_2CO_3$ at approximately 5 wt %, carboxymethylinulin at approximately 1% vol. and at approximately 30-32 wt %, and sodium gluconate at approximately 10 wt %;
   exposing a surface contaminated with said barium scale to the composition; and
   allowing a sufficient time of exposure to remove said barium scale from the contaminated surface.

* * * * *